(12) United States Patent
Banasco

(10) Patent No.: US 7,549,665 B1
(45) Date of Patent: Jun. 23, 2009

(54) TRAILER ALIGNMENT ACCESSORY

(76) Inventor: Andres Banasco, 380 SW. 4th St. Apt. 17, Miami, FL (US) 33130

( * ) Notice: Subject to any disclaimer, the term of this patent is extended or adjusted under 35 U.S.C. 154(b) by 342 days.

(21) Appl. No.: 11/562,851

(22) Filed: Nov. 22, 2006

(51) Int. Cl.
B60P 3/10 (2006.01)
(52) U.S. Cl. .................................................. 280/414.1
(58) Field of Classification Search ............... 280/414.1
See application file for complete search history.

(56) References Cited

U.S. PATENT DOCUMENTS

| 3,447,815 | A | * | 6/1969 | West ........................... 280/144 |
| 3,547,285 | A | * | 12/1970 | Plummer ..................... 414/534 |
| 4,011,958 | A | * | 3/1977 | Carrick ........................ 414/529 |
| 4,209,279 | A | * | 6/1980 | Aasen .......................... 414/534 |
| 4,500,249 | A | * | 2/1985 | Johansson ................... 414/534 |
| D288,795 | S | * | 3/1987 | Toppero, Jr. ............... D12/106 |
| 4,779,887 | A | * | 10/1988 | Briggs ....................... 280/414.1 |
| 5,316,329 | A | * | 5/1994 | MacKarvich ............ 280/414.1 |
| 6,575,487 | B1 | * | 6/2003 | Krause ..................... 280/414.1 |
| 2003/0209877 | A1 | * | 11/2003 | Beyer ....................... 280/414.1 |

* cited by examiner

Primary Examiner—Paul N Dickson
Assistant Examiner—Michael R Stabley
(74) Attorney, Agent, or Firm—Sanchelima & Associates, P.A.

(57) ABSTRACT

An apparatus for mounting boats to a trailer by using the thrust of a motor in a boat to cooperate with an alignment mechanism to keep the bow in alignment. Similar arms with cooperating rollers mounted thereon are cammingly separated when the bow pushes against one or both of them. The reaction force is proportional to its deflection thereby helping, within certain limits, the alignment of the bow. By keeping the synchronization of the arms movement the boat's bow can be more readily aligned to facilitate the mounting of the boat to a trailer without requiring additional help. The arms carrying the rollers are resiliently biased in a predetermined position that is overcome by applying a force of a predetermined magnitude.

5 Claims, 4 Drawing Sheets

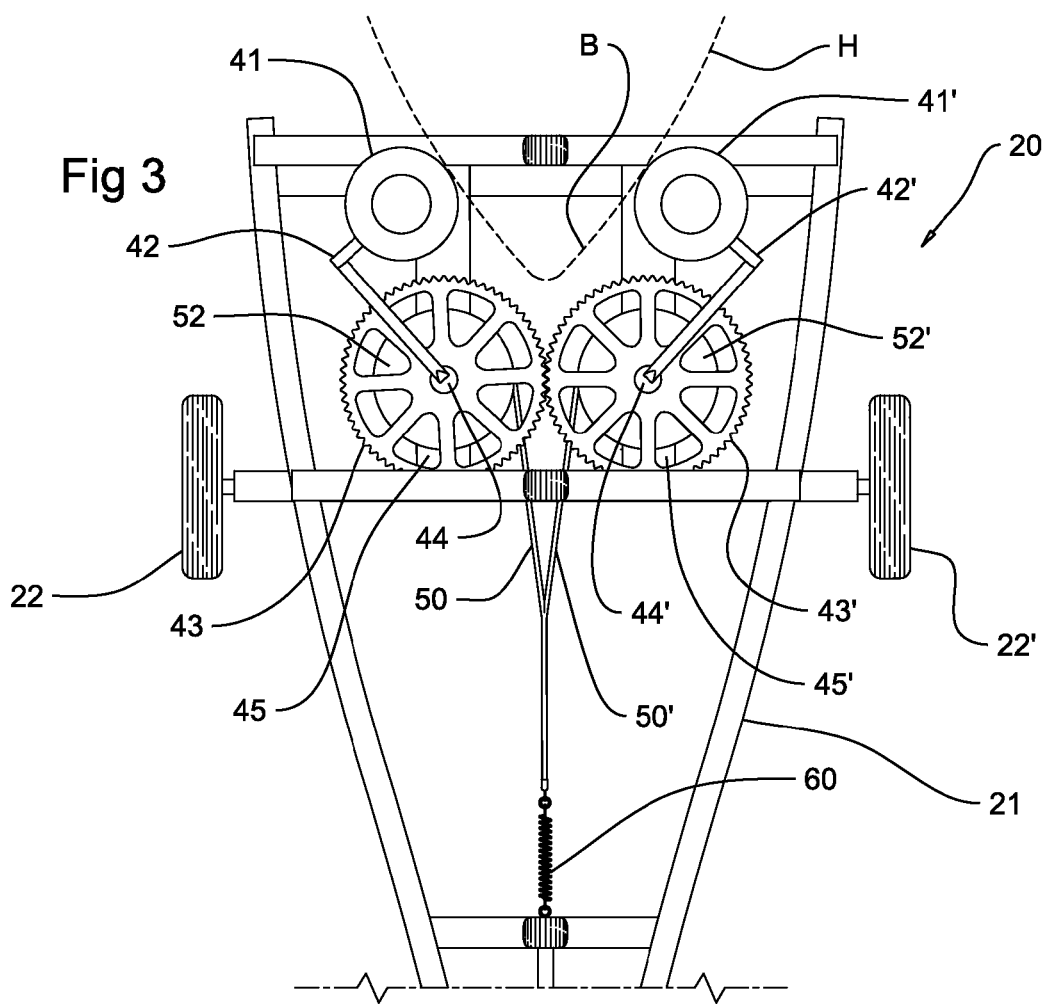
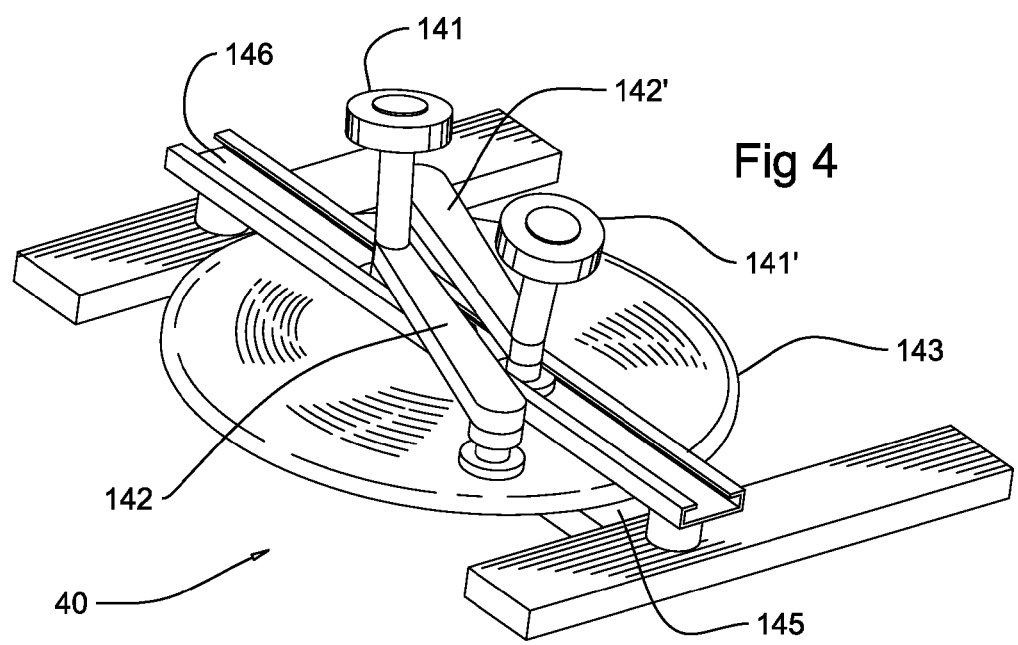

TRAILER ALIGNMENT ACCESSORY

BACKGROUND OF THE INVENTION

Field of the Invention

The present invention relates to a trailer alignment apparatus, and more particularly, to an apparatus for mounting boats to a trailer by using the thrust of a motor in a boat with an alignment mechanism to keep the bow in alignment.

It is common to find water currents in a channel, or other bodies of water where a boat trailer is positioned to lift the boat out of the water. Many times the user cannot merely steer the boat towards the trailer in a sufficiently aligned position. In these cases, a user requires a helper to push the bow into alignment. Slippery conditions, or other dangerous conditions, sometimes makes the help unavailable. With the present invention a user uses the power of the motor boat to bring the bow into contact with the alignment arm which urges the bow towards the center thus resulting in the alignment of the boat for readily mounting it on the trailer.

SUMMARY OF THE INVENTION

It is one of the objects of the invention is to provide a trailer for boats that facilitates the alignment of the boat when the latter is ready to be mounted on the trailer.

Another object is to provide an apparatus that permits a user to secure the boat to a trailer.

It is yet another object of this invention to provide such an apparatus that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a partial top view of the embodiment shown in FIG. 1.

FIG. 4 shows an isometric view of an alternate embodiment of the alignment assembly.

DETAILED DESCRIPTION OF THE PREFERRED EMBODIMENT

Figure 1:
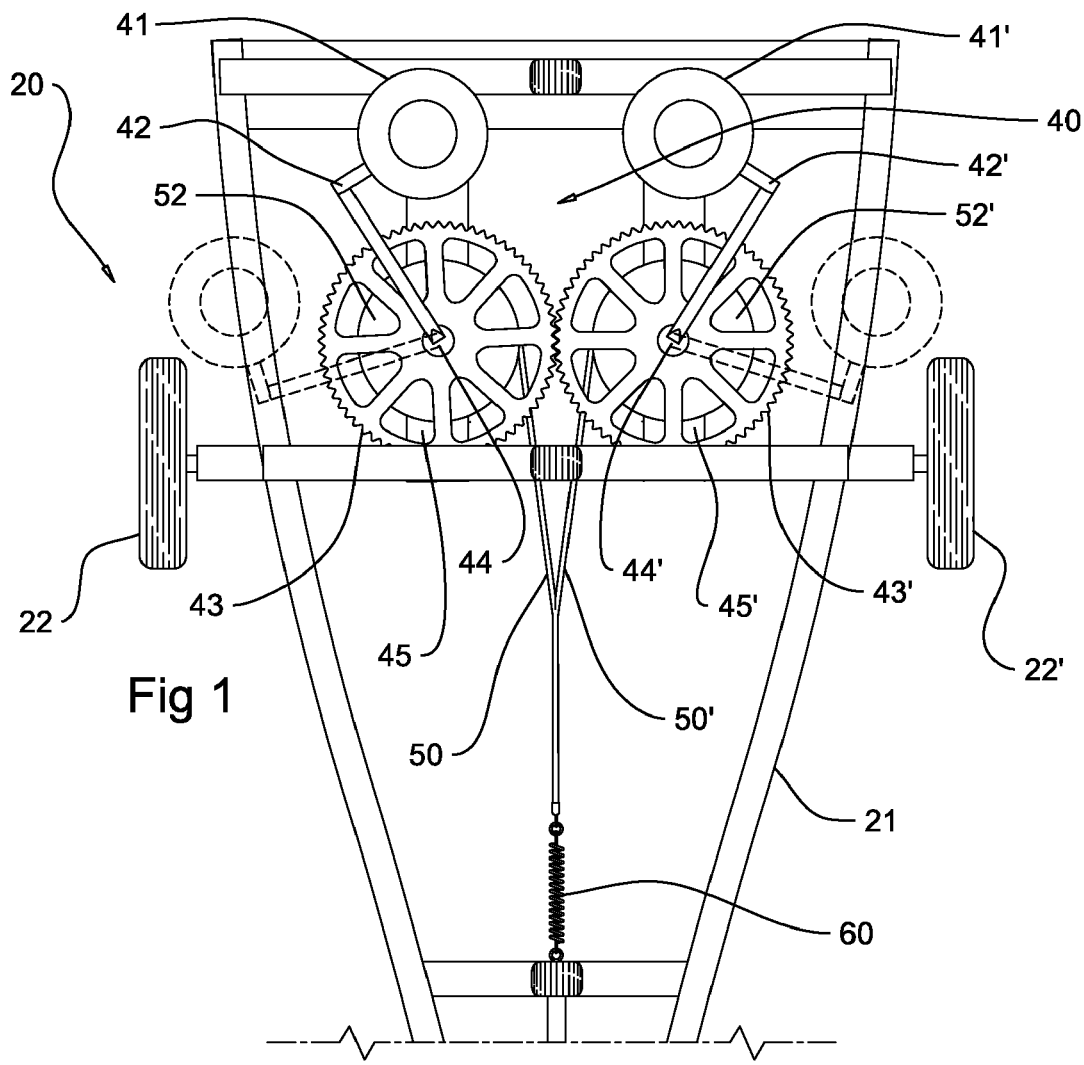
FIG. 1 represents a top view of one of the preferred embodiments of the present invention and a partial view of the trailer where it is mounted.
Figure 2:
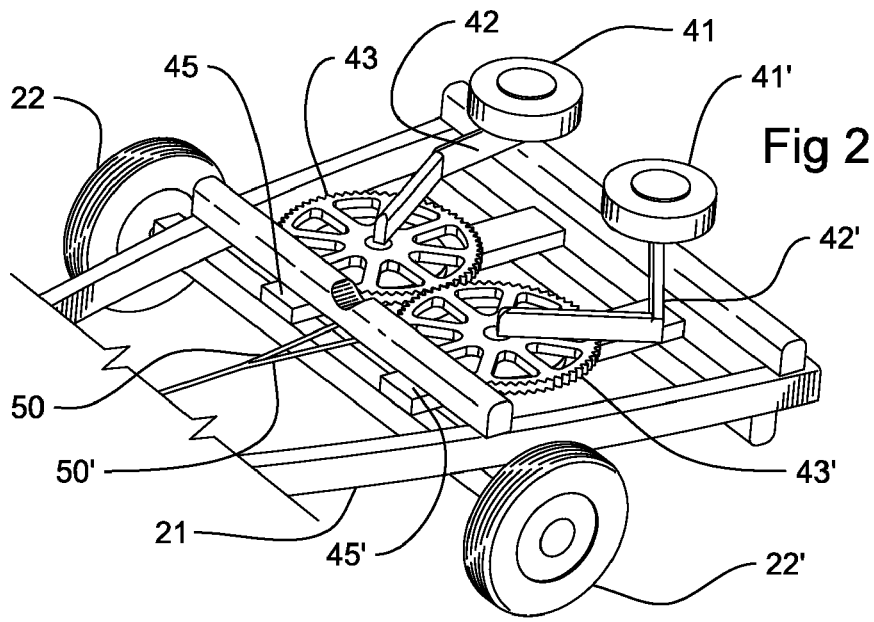
FIG. 2 is an isometric view of the alignment assembly with a partial representation of the trailer where it is mounted.
Figure 5:
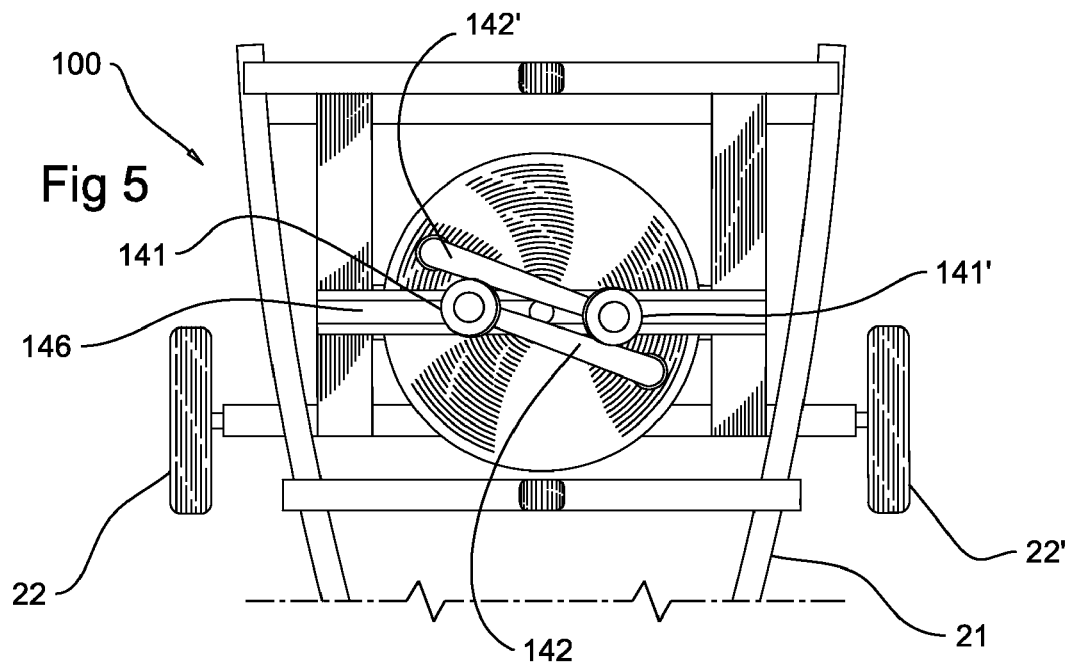
FIG. 5 represents a partial top view of the alternate embodiment represented in the previous figure.
Figure 7:
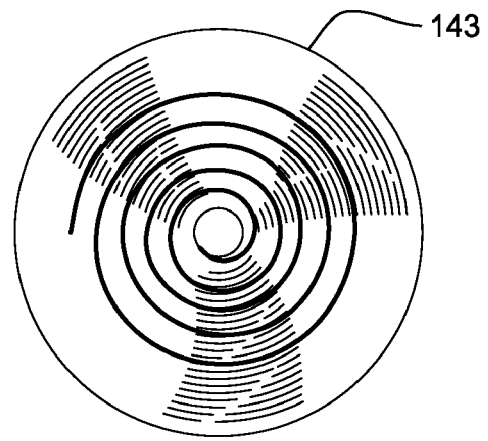
FIG. 7 illustrates a bottom plan view of the coil spring mechanism mounted to the wheel assembly.
Figure 6:
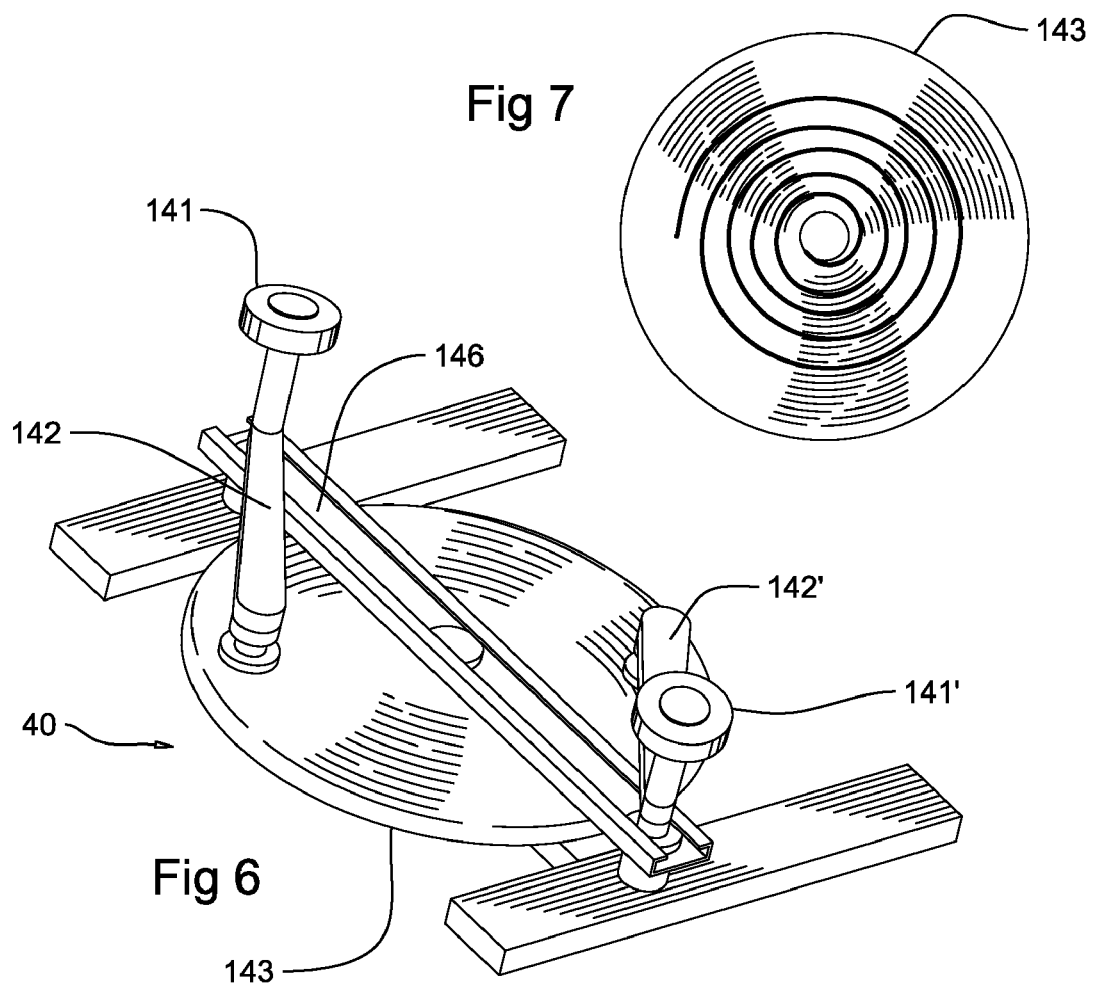
FIG. 6 shows an isometric view of the alignment assembly for the alternate embodiment shown in the previous two figures.

The invention includes trailer frame assembly 20, which corresponds to a conventional trailer for boats with frame 21 and at least two opposite wheel assemblies 22 and 22' and an alignment mechanism assembly 40 cooperatively mounted thereon. Assembly 40 includes, in the preferred embodiments, arm assemblies 42 and 42', opposite and spaced apart from each other. Assemblies 42 and 42' are spring biased by spring assemblies 44 and 44' urging them toward each other. In this manner, a user can bring the bow of a boat B in a proximate position where arm assemblies 42 and 42' are and propel boat B towards trailer. The more off alignment the bow is, the greater the opposite force generated by either spring assembly 44 or 44' is produced to urge bow toward center.

In one of the preferred embodiments, as seen in FIGS. 1; 2 and 3, alignment mechanism assembly 40 includes two arm assemblies 42 and 42', each including roller members 41 and 41', at their respective distal ends and at a cooperative higher position than wheels 43 and 43' to clear the boat's hull H. Arm assemblies 42 and 42' are rigidly mounted to respective teethed wheels 43 and 43' which are in turn pivotally mounted to platform members 45 and 45', rigidly mounted to the structure of trailer T. Coil spring assemblies 44 and 44' urge wheels 43 and 43' to stay in a predetermined position with cooperatively mounted arm assemblies 42 and 42' also extending at a predetermined position. In this way, roller members 41 and 41' are kept at a spaced apart relationship with respect to each other that permits receiving bow B of a boat, typically a motor boat, to cammingly separate them upon the application of a predetermined amount of force generated by the boat's motor (s). In this preferred embodiment, teethed wheels 43 and 43' may be meshed to each other so that there is a simultaneous rotation and movement of arm assemblies 42 and 42'. Cord members 50 and 50' are wound to spool 52 and 52' at one end and the free ends joined to spring member 60. This permits more readily insertion of bow B than if wheel 43 and 43' were not meshed.

Another equivalent embodiment for the present invention is generally referred to with numeral 100, as shown in FIGS. 4 through 7. Wheel assembly 143 is rotably mounted to platform member 145 and includes arm assemblies 142 and 142', each pivotally mounted to a point on wheel 143 on one end and slidably guided over guiding track member 146 with the other end. Track member 146 is rigidly mounted to the structure of trailer T. Roller members 141 and 141' protrude upwardly at a parallel and spaced apart relationship with respect to each other to cooperatively receive bow B of a boat. Roller members 141 and 141' coact with bow B of a boat urging it into alignment.

Figure 8:
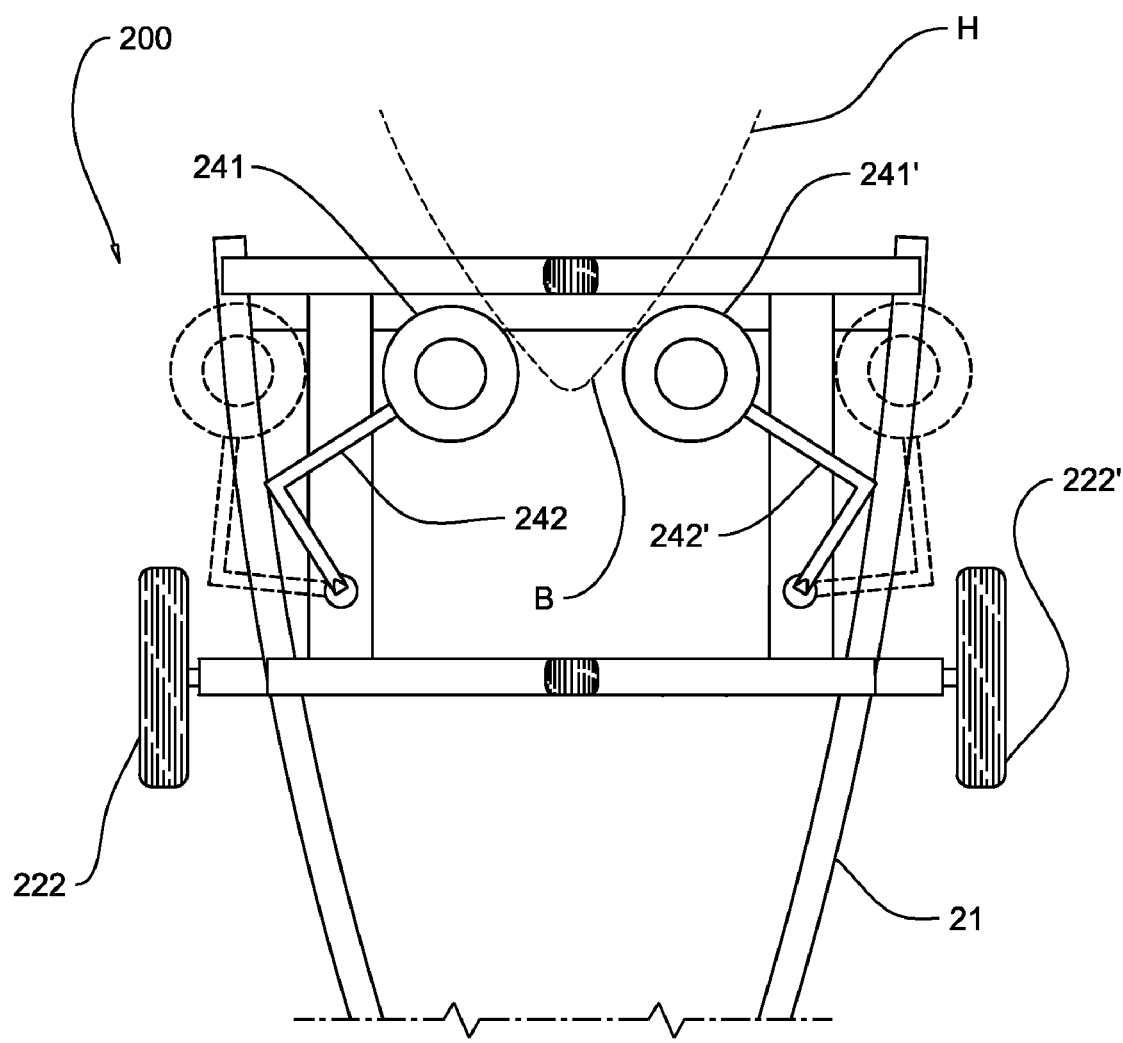
FIG. 8 shows a top view of an alternate embodiment with independent arm assemblies 241 and 241'.

In FIG. 8, another embodiment is shown and referred to as accessory 200. Arm assemblies 242 and 242' with their respective roller members 241 and 241', are shown with their also respective torsion spring members 260 and 260'.

Other equivalent mechanisms can be used to implement the present invention's objects and features. In essence, providing two roller members supported by their respective arms in resilient arrangement via a spring, pneumatic or other means, to permit a user to cammingly separate them to receive the boat's bow B in between to achieve alignment. The reaction forces of the roller members cause bow B to come into alignment.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for mounting boats to a trailer structure, comprising:

A) a trailer assembly having a frame with two spaced apart wheel assemblies;

B) an alignment assembly mounted to said frame having first and second arm means, each of said arm means having first and second ends, and said first ends kept at a spaced apart relationship with respect to each other and extending above said frame, and further including means for biasing said first and second arm means to resiliently keep a predetermined position wherein said alignment assembly includes means for causing said first and second arm means to move in substantially simultaneous and opposite directions; and C) first and second roller means mounted, respectively, to said second ends to cooperatively receive the bow of a boat when said first ends are cammingly deflected upon the application of a force of a predetermined magnitude by said bow.

2. The apparatus set forth in claim 1 wherein said alignment assembly includes meshed first and second teethed wheels rotably mounted to said frame and said second ends being pivotally mounted to said first and second teethed wheels, respectively, so that the movement of said first and second arm means is synchronized.

3. The apparatus set forth in claim 2 wherein said means for biasing said first and second arm means includes a spring means.

4. The apparatus set forth in claim 3 wherein said spring means includes a flexible cord means wound to said teethed wheels with a free end and a spring member with two ends, one of said ends being mounted to a fixed point in said trailer and the other end mounted to said free end, so that said teethed wheels are biased to oppose their rotation in a given direction.

5. The apparatus set forth in claim 1 wherein said alignment assembly includes a wheel rotably mounted to a fixed point in said trailer and said second ends being pivotally mounted to predetermined cooperative positions of said wheel, and further including a guiding track for cooperatively said first ends, so that the movement of said first and second arm means is synchronized and said first and second roller means move substantially simultaneously and in opposite direction.

* * * * *